P. WUEST, Jr.
VALVE MECHANISM FOR PIANO PLAYERS.
APPLICATION FILED JULY 31, 1912.
1,127,146.
Patented Feb. 2, 1915.
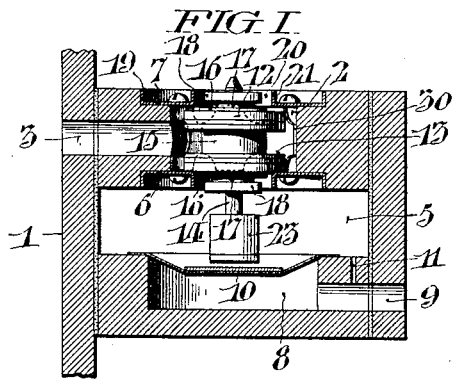
FIG. I.
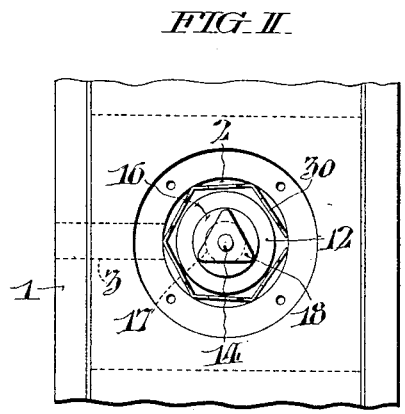
FIG. II.
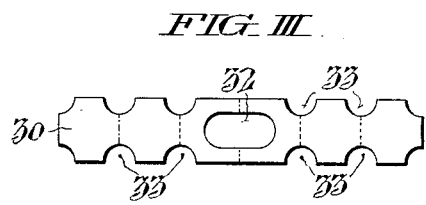
FIG. III.
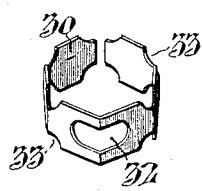
FIG. IV.
Inventor
Philip Wuest Jr.,
Witnesses
John C. Bergner
Thomas W. Kerr Jr.
Attorneys.

UNITED STATES PATENT OFFICE.

PHILIP WUEST, JR., OF WOODBURY, NEW JERSEY, ASSIGNOR TO OSCAR BLASIUS, OF PHILADELPHIA, PENNSYLVANIA.

VALVE MECHANISM FOR PIANO-PLAYERS.

1,127,146.   Specification of Letters Patent.   Patented Feb. 2, 1915.

Application filed July 31, 1912. Serial No. 712,375.

*To all whom it may concern:*

Be it known that I, PHILIP WUEST, Jr., of Woodbury, in the county of Gloucester and State of New Jersey, have invented certain new and useful Improvements in Valve Mechanism for Piano-Players, whereof the following is a specification, reference being had to the accompanying drawings.

The invention relates more particularly to the construction of the valve and the means for guiding it to its seat.

An embodiment of the invention is shown in the accompanying drawings in which—

Figure I, is a sectional view, and Fig. II, a plan view showing the valve. Figs. III, and IV, are detail views of the valve guide.

The valve box 1, is provided with a chamber 2, which is connected by a passage 3, with a suitable source of pneumatic pressure. The valve box is formed with a second chamber 5, leading to the exhaust. An opening between the chamber 2, and the chamber 5, is partly closed by a valve seat 6, and an opening between the chamber 2, and the atmosphere is partially closed by an opposing valve seat 7. The valve lies between these two valve seats and has faces which rest upon one or the other of these valve seats closing their aperture according as the valve is in its upper or lower position. The valve box is formed with a third chamber 8, which communicates by a passage 9, with a corresponding aperture in a tracker bar (not shown) whereby the action of the valve may be controlled as by a perforated sheet. A diaphragm 10, separates the chamber 8, from the chamber 5, and the movement of this diaphragm when air is admitted to the chamber 8, effects the motion of the valve, the bleed aperture 11, serving to equalize pressure upon both sides of the diaphragm.

The valve consists of two valve members 12, and 13, of which the former is adapted to engage the valve seat 7, and the latter to engage the valve seat 6. These valve members are threaded upon the valve stem 14, which is provided with a spiral thread (not shown) through its entire length. The valve members are spaced by a felt pad 15, so that the closing surfaces of the valve are separated by a distance somewhat less than that which separates the two valve seats 6, and 7. Metallic washers 16, engage the outer faces respectively of the valve members 12, and 13. Paper washers 17, rest upon the outer faces of the metallic washers and disks 18, conveniently shaped for rotation, are threaded onto the valve stem and engage the outer faces of the paper washers. By this threading of the valve members and disks, on the threaded stem 17, each member becomes in effect a nut lock for the others. Each of the valve seats 6, and 7, is provided at its outer edge with a laterally projecting strengthening flange 19, and also with a similarly projecting strengthening flange 21, surrounding its central aperture 20. The lower end of the valve stem is provided with an adjustable button 23, which is adapted to coöperate with the diaphragm 10.

In order that the valve may be guided and properly seated, an angular guide piece 30, is provided within the chamber 2, in position to surround and guide the valve. This guide 6, is shown in perspective in Fig. IV, and as shown is a metallic hollow hexagon, the interior flat faces of which are adjusted so as to nearly but not quite touch the edges of the valve when it rests centrally within it, while its angles engage the walls of the chamber 2, holding it firmly in its seat. Although shown as a hexagon, the number of sides and angles is not material provided it is made of a shape to accomplish the required function. The guide piece is preferably made from a single strip of metal stamped as shown in Fig. III. It is provided with an aperture 32, which registers roughly with the passage 3, leading to the valve chamber. It is also provided with notches 33, along its upper and lower edge, whereby its width is decreased at the points where it is to be bent, (along the dotted lines), to form its angles. These notches further provide for free circulation of the air, within the valve chamber.

When stamped in the form shown in Fig. III, and bent along the dotted lines therein, the guide piece takes the form shown in Fig. IV, and may readily be sprung in place within the valve chamber, when one or other of the valve seats 6, and 7, is removed, and by the replacement of the valve seat, the guide piece is held firmly in position, its inner walls being close enough to the perimeter of the valve to effectively act as a guide, while at the same time allowing sufficient freedom of play, and also providing for the free passage of air in the valve chamber.

In the operation of my device when air is admitted to the passage 9, the diaphragm is lifted thus lifting the valve stem which carries the valve member 12, into contact with the valve seat 7, the guide piece 30, preventing too great freedom of motion and compelling the valve to seat truly. This movement of the valve also carries the valve member 13, away from its seat 6, and opens the passage between the chambers 2, and 3, thus connecting the pneumatic with the exhaust chamber 5. When the air is cut off from the passage 9, the diaphragm 10, is relaxed and the operation is reversed.

It is obvious that minor changes in the details of construction and arrangement of parts may be made without departing from the spirit of the invention as set forth in the appended claims.

Having thus described my invention, I claim:

1. A circular valve chamber provided with opposed valve seats, a circular valve with two valve surfaces mounted upon an axial stem and lying with freedom of motion within the valve chamber, between the opposed valve seats; and an angular hollow guide piece within the circular valve chamber loosely surrounding the valve with inner surfaces between the angles in position to truly guide the same.

2. A valve chamber provided with opposed valve seats, a valve with two valve surfaces mounted upon an axial stem and lying with freedom of motion within the valve chamber between the opposed valve seats, and an angular hollow guide piece fitting within the valve chamber and provided with cut away portions to permit free passage of the air within the valve chamber.

In testimony whereof, I have hereunto signed my name at Philadelphia, Pennsylvania this 26th day of July 1912.

PHILIP WUEST, Jr.

Witnesses:
E. L. FULLERTON,
AGNES REID.

Copies of this patent may be obtained for five cents each, by addressing the "Commissioner of Patents, Washington, D. C."